(12) United States Patent
Garg et al.

(10) Patent No.: US 9,448,612 B2
(45) Date of Patent: Sep. 20, 2016

(54) MANAGEMENT TO REDUCE POWER CONSUMPTION IN VIRTUAL MEMORY PROVIDED BY PLURALITY OF DIFFERENT TYPES OF MEMORY DEVICES

(71) Applicants: Ankita Garg, Bangalore (IN); Dipankar Sarma, Bangalore (IN); Vaidyanathan Srinivasan, Bangalore (IN)

(72) Inventors: Ankita Garg, Bangalore (IN); Dipankar Sarma, Bangalore (IN); Vaidyanathan Srinivasan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 369 days.

(21) Appl. No.: 13/674,268

(22) Filed: Nov. 12, 2012

(65) Prior Publication Data

US 2014/0136864 A1    May 15, 2014

(51) Int. Cl.
*G06F 1/32* (2006.01)

(52) U.S. Cl.
CPC .......... *G06F 1/3275* (2013.01); *Y02B 60/1228* (2013.01)

(58) Field of Classification Search
CPC .............. G06F 1/00; G06F 1/04; G06F 1/12; G06F 1/26; G06F 1/32; G06F 11/30; G06F 15/16
USPC ................................. 713/300, 310, 330, 340
See application file for complete search history.

(56) References Cited

U.S. PATENT DOCUMENTS

| | | | |
|---|---|---|---|
| 7,539,841 B2 | 5/2009 | Rawson, III | |
| 7,549,034 B2 | 6/2009 | Foster, Sr. et al. | |
| 7,961,542 B2 | 6/2011 | Smith | |
| 2003/0028711 A1 | 2/2003 | Woo et al. | |
| 2006/0181949 A1 | 8/2006 | Kini | |
| 2007/0005998 A1* | 1/2007 | Jain et al. ...................... 713/300 |
| 2008/0082779 A1* | 4/2008 | Ogasawara ........... G06F 1/3203 711/170 |
| 2008/0313482 A1 | 12/2008 | Karlapalem et al. |
| 2009/0327794 A1* | 12/2009 | Kapil ............................ 713/600 |
| 2011/0093654 A1* | 4/2011 | Roberts ................. G06F 1/3203 711/105 |
| 2011/0145609 A1* | 6/2011 | Berard .................. G06F 1/3203 713/320 |
| 2011/0235456 A1* | 9/2011 | Jin ........................... G11C 5/14 365/226 |
| 2012/0144144 A1* | 6/2012 | Worthington et al. ........ 711/165 |
| 2012/0284475 A1* | 11/2012 | Zaarur ........................ 711/165 |
| 2013/0031298 A1* | 1/2013 | Tan ...................... G06F 12/0246 711/103 |
| 2013/0060993 A1* | 3/2013 | Park ....................... G06F 17/30 711/103 |
| 2013/0227218 A1* | 8/2013 | Chang et al. ................. 711/118 |
| 2013/0329491 A1* | 12/2013 | Chang ..................... G11C 5/04 365/185.03 |
| 2014/0032818 A1* | 1/2014 | Chang et al. ................. 711/103 |
| 2014/0047251 A1* | 2/2014 | Kottilingal et al. .......... 713/320 |

OTHER PUBLICATIONS

Energy Conservation in Memory Hierarchies Using Power-Aware Cached-DRAM, AbouGhazaleh et al, Dagstuhl Seminar Proceedings 05141, Power-aware Computing Systems, http://drops.dagstuhl.de/opus/volltexte/2005/304.

(Continued)

*Primary Examiner* — Thomas Lee
*Assistant Examiner* — Mohammad A Rahman
(74) *Attorney, Agent, or Firm* — J. B. Kraft; Parashos Kalaitzis

(57) ABSTRACT

Reduction of memory power consumption in virtual memory systems that have a combination of different types of physical memory devices working together in a system's primary memory to achieve performance with optimum reductions in power consumption by storing in the virtual memory in the kernel, topology data for each of the different memory devices used.

24 Claims, 4 Drawing Sheets

(56) References Cited

OTHER PUBLICATIONS

*Design and Implementation of Power-Aware Virtual Memory*, Hai Huang et al., Department of Electrical Engineering and Computer Science, The University of Michigan, {haih,pillai,kgshin}@eecs.umich.edu.

*Managing Memory for Power, Performance, and Thermal Efficiency*, Matthew E. Tolentino, Dissertation submitted to the Faculty of the Virginia Polytechnic Institute & State University in partial fulfillment of the requirements for the degree of Doctor of Philosophy in Computer Science and Applications, Feb. 18, 2009, Blacksburg, VA.

*Memory Power Management*, Jonathan Corbet, Jun. 7, 2011, http://lwn.net/Articles/446493/?format=printable.

* cited by examiner

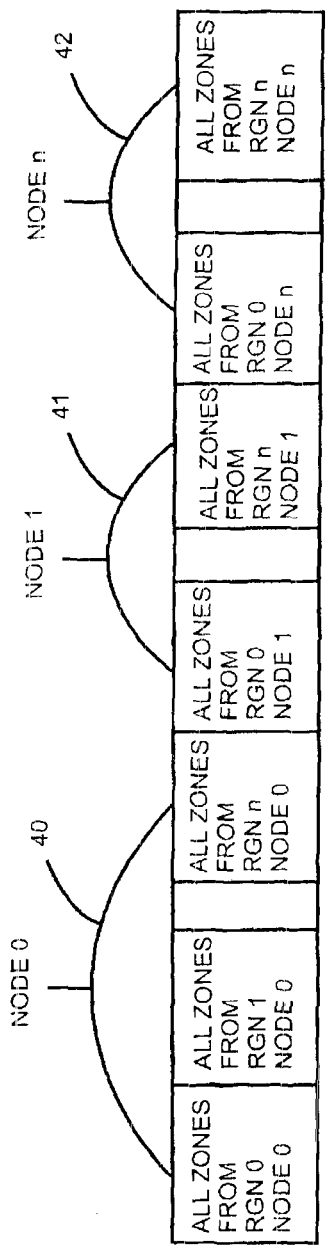
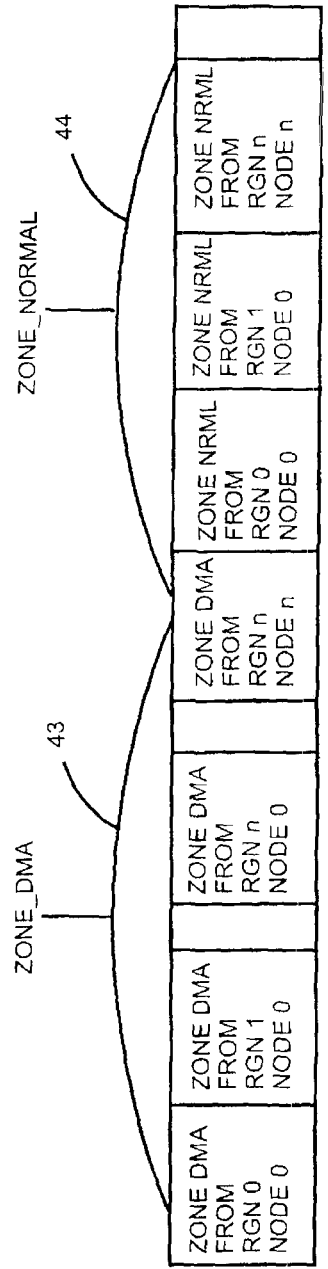
FIG. 3
FIG. 4

MANAGEMENT TO REDUCE POWER CONSUMPTION IN VIRTUAL MEMORY PROVIDED BY PLURALITY OF DIFFERENT TYPES OF MEMORY DEVICES

TECHNICAL FIELD

The present invention is directed to memory used to implement virtual memory and particularly to the reduction of power consumption in the virtual memory itself.

BACKGROUND OF PRIOR ART

Virtual memory is an abstract concept of memory that a computer system uses when it references memory. Virtual memory consists of the computer system's main memory (RAM), which at the present state of the art is DRAM and DDRAM, its file systems and paging space. At different points in time, a virtual memory address referenced by an application may be in any of these locations. The application does not need to know which location as the computer system's virtual memory manager (VMM) will transparently move blocks of data around as needed.

Power consumption has become a significant factor in the operational costs of the computer data centers. The information systems industries have continuously sought to reduce power consumption in data processing equipment. In recent years, it has been appreciated that even operational virtual memory energy, i.e. power consumption, will have a significant effect on power consumption costs. Consequently, conventional virtual memory controllers now have the capability of putting DRAM or DDRAM memory portions into lower power consumption modes during idle states.

Such conventional powering down approaches involved significant enhancements of the memory controller structure. While these virtual memory power reduction implementations have been relatively effective where the memory system uses one type of physical memory, the need for a virtual memory system to use or have available for use a combination of different types of physical memory presents a challenge to the reduction of memory power consumption. This invention aims to satisfy a need in virtual memory technology to have a combination of different types of physical memory devices work together in tandem as a system's primary memory to achieve performance with optimum reductions in power consumption. Some conventional physical memory devices that may be combined with conventional memory are Phase Change Memory (PCM), flash memory and memory with support for power management.

SUMMARY OF THE INVENTION

The present invention provides for reduction of memory power consumption in virtual memory systems that have a combination of different types of physical memory devices working together in a system's primary memory to achieve performance with optimum reductions in power consumption.

To this end, the invention provides for the storing in the virtual memory kernel, topology data for each of the different memory devices used. This topology data includes data on the memory structure, which structure includes a memory bank data structure for each of the different devices including a plurality of independently powered memory regions, each memory region having at least one set of power consuming zones of diminishing power consumption levels. Then, in the memory system, the power consumption levels are dynamically reduced in these regions, under kernel control, to the lowest power consumption zone for each region.

In accordance with an aspect of the invention, in the dynamically reducing step, a region is reduced to a lower power consumption zone if the region is not referenced for a predetermined period of time. Preferably, in the allocation of user data, fewer regions are referenced, and more regions are not referenced for the predetermined period of time, and are reduced to the lowest power consumption zone.

In accordance with another aspect of the present invention, one memory region may have a plurality of sets of power consumption zones of diminishing power consumption levels. One of the plurality of sets of zones in the one memory region may be a phase-change memory (PCM) that normally has higher power consumption. In such a case, the dynamically reducing step would minimize referencing of the PCM. Alternatively, the PCM may be designed with a lower power consumption in which case the opposite effect would be implemented.

Memory regions are linked to a region of mirrored memory for enhanced reliability. In this case, it is preferable to referencing regions with links to mirrored memory to maintain said enhanced reliability.

This invention is applicable to a plurality of memory banks with each bank including a plurality of the independently powered memory regions, wherein entire memory banks have all of their regions reduced to the lowest power consumption zone.

In accordance with another aspect of the present invention, a zonelist, to be used in referencing regions, is built as sequences of zones of the same power consumption level from each of said plurality of regions.

BRIEF DESCRIPTION OF THE DRAWINGS

The present invention will be better understood and its numerous objects and advantages will become more apparent to those skilled in the art by reference to the following drawings, in conjunction with the accompanying specification, in which:

FIG. 3 is a logic zonelist built in node order that may be used in the practice of the present invention;

FIG. 4 is a logic zonelist built in zone order that may be used in the practice of the present invention.

DETAILED DESCRIPTION OF THE PREFERRED EMBODIMENT

Figure 1:
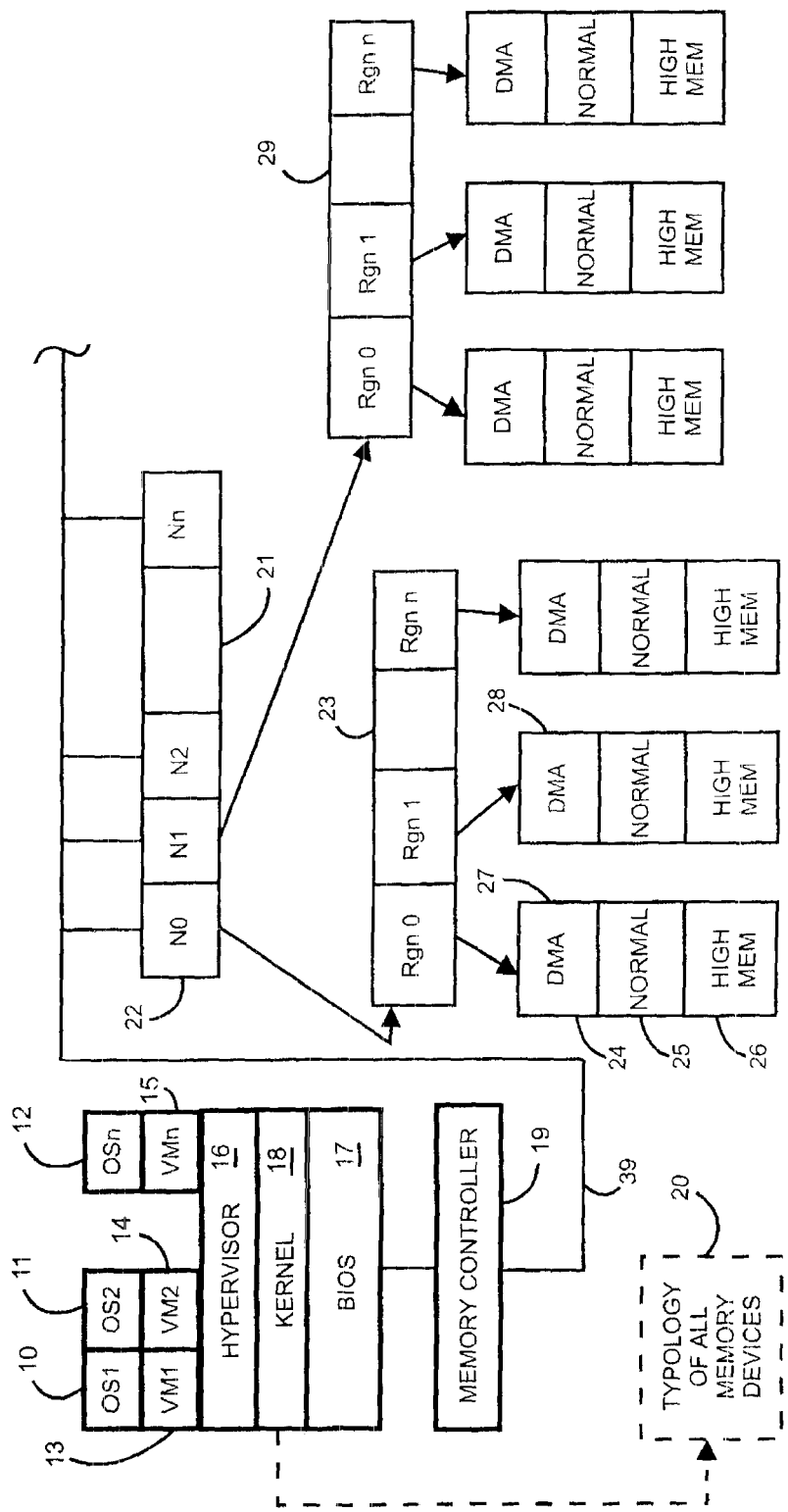
FIG. 1 is a block diagram of a generalized portion of a virtual memory system used in the present invention showing a multicore virtual machine platform connected to virtual memory, through a memory controller, to control a bank of nodes to memory regions.

Referring to FIG. 1, there is shown a generalized portion of a virtual memory system according to the present invention showing a multicore virtual machine platform connected to virtual memory through a memory controller 19, supported by Hypervisor 116 with its BIOS 17 and associated kernel 18 to control Virtual Machines VM1 13, VM2 14 and VMn 15 that have their respective Operating OS1 10, OS2 11 and OSn 112. The I/O and memory activity are controlled by memory controller 19 connected by bus 39 to set 21 of nodes (N0, N1 and Nn) 22 with each node connected to at least one bank of regions, e.g. node N0 in set 21 is connected to bank 23 having regions, Rgn 0, Rgn 1 through Rgn n. In turn, each region is respectively connected to a defined memory unit, e.g DIMM or rank 27 of zones DMA 24, Normal 25, High Mem 26 with each zone suitable to a level of memory usage. Kernel 18 maps directly to the normal zone that is suitable for most memory transactions and from which mapping may be done to zone high mem for certain needs.

Because the physical memory provided in the present invention may be of different types, e.g. flash memory, PCM or memory with its own support for power management, each of different memory type would respectively have some of its own unique properties. It is, thus, significant for the practice of this invention that data in VM kernel 18 provides the effective power management for the various types of physical memory devices providing the virtual memory. Accordingly, it is necessary to provide in the kernel, the memory data structures of all of the types of physical memory used for the virtual memory. This device memory topology 20 is stored in the kernel 18 so that it is available for use in the various memory algorithms as the allocation and deallocation or reclamation in accordance with the present invention.

With the above-described organization, the present invention operates to get the greatest number of regions ranks 27, 28 into the lowest power consumption zones 24 (DMA). In general, if a memory part, e.g. region, is not referenced for a predetermined period of time, it may be transitioned into a lower power zone.

Figure 2:
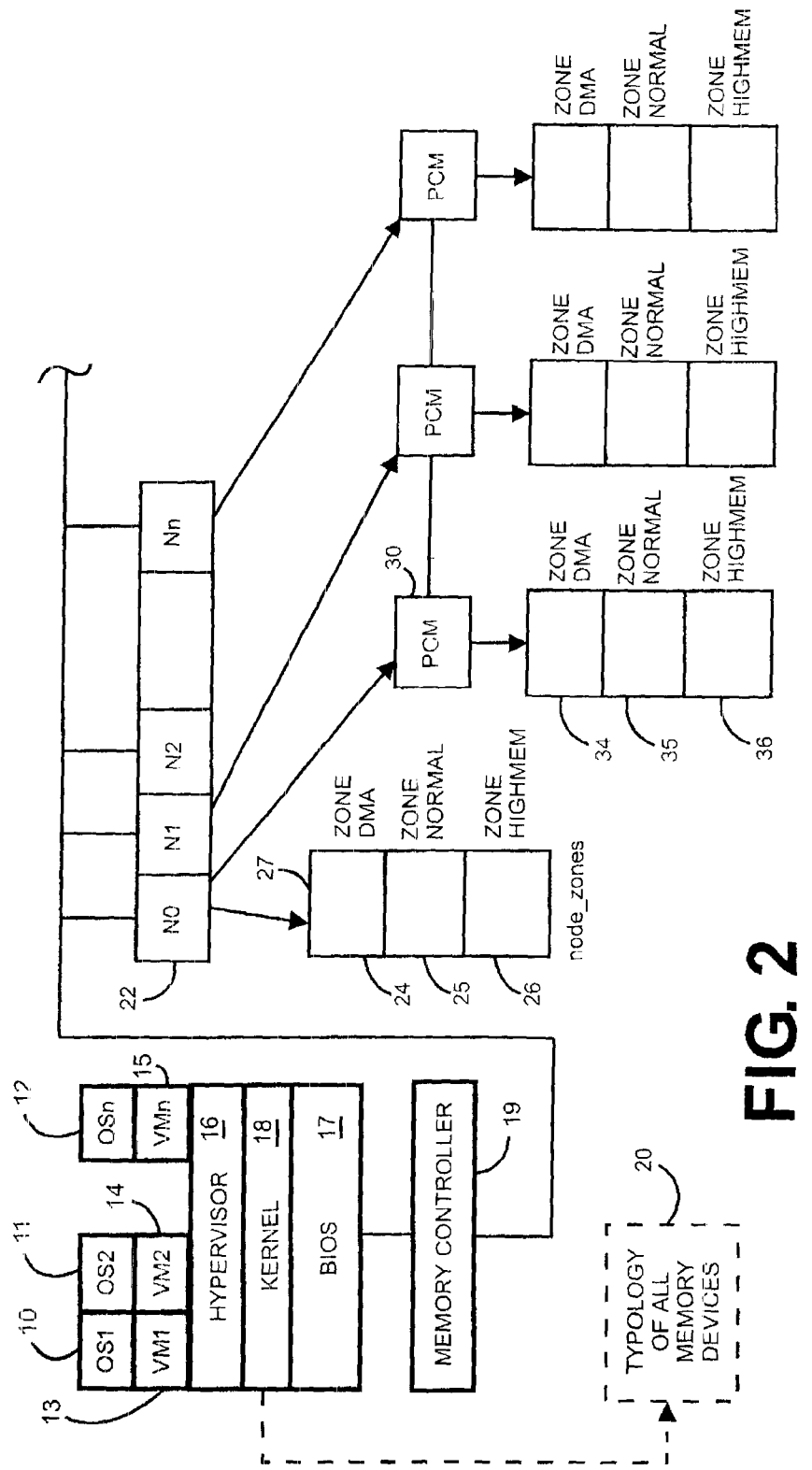
FIG. 2 is a block diagram of a generalized portion of a virtual memory system, like that of FIG. 1, according to the present invention showing a multicore virtual machine platform connected to virtual memory through a memory controller wherein individual nodes are connected to more than one region.

Now with reference to FIG. 2, there is shown a block diagram of a generalized portion of a virtual memory system, like that of FIG. 1, except that individual nodes are connected to more than one different type of memory region. Node N0 22, for example, in addition to being connected to memory unit, e.g DIMM or rank 27 of zones 24, 25, and 26, is also connected to a different type of physical memory, rank 30 having zones DMA 34, Normal 35, High Mem 36 with each zone suitable to a level of memory usage.

Kernel 18 maps directly to the normal zone that is suitable for most memory transactions and from which mapping may be done to zone high mem for certain needs. Since the topology 20 of the PCM (Phase-change Memory), a different type of memory, is already available to the kernel 18, kernel 18 can map to rank 30. However, it should be noted that in the practice of the present invention with higher power consumption of PCM relative to other memory, the process of dynamically reducing should include minimizing referencing of said PCM regions so that power consumption resulting from PCM operations may be minimized.

Likewise, a node 22 may be linked to a region of another type of memory: mirrored memory for enhanced reliability, and further including referencing regions with links to mirrored memory to maintain said enhanced reliability. This is done because mirrored memory has increased reliability for stored data in mirrored memory regions. Of course, since the topology 20 of the mirrored memory is available to kernel 18, this distinction may be practiced under kernel control.

While examples have been presented for PCM and mirrored types of different memory operating in tandem with the basic physical memory, it should be understood that the principles of this invention would be operable with a variety of different types of physical memory, such as flash memory, as long as the different memory topology 20 is accessible to kernel 18.

As shown with respect to FIGS. 3 and 4, logic zonelists provided for the allocation and deallocation are built up by traversing all of the regions and zones in a node. There should be no effects on the carrying of the various VM algorithms. Thus, for carrying out allocations and deallocations, zonelists, FIG. 3, are provided that are listed in the order of the regions to which the zones belong. Also, as shown in FIG. 4, zonelist could be built in zone order consisting of zones of the same level (e.g. DMA) belonging to different regions followed by zones of another level (e.g. NORMAL) belonging to different regions.

With respect to the aspect of the invention involving zonelists, in mirror memory, portions of memory is mirrored in physical hardware. In such a case, the mirrored memory portion would be considered a separate memory type, the topology of which would be accessible to kernel 18 through the stored topology 20, FIG. 1. A separate zonelist, FIG. 3 or 4, would be maintained for selective mirrored memory allocations.

With respect to PCM, since it has properties very different than the standard DRAM used for the basic memory, the PCM may be used for specific allocations. Whether the pages are located in the basic memory or in PCM can have an effect on power consumption. Write operations are slower in PCM than reads and consume more power. Thus, with frequently updated data, DRAM should be used rather than PCM.

Figure 5:
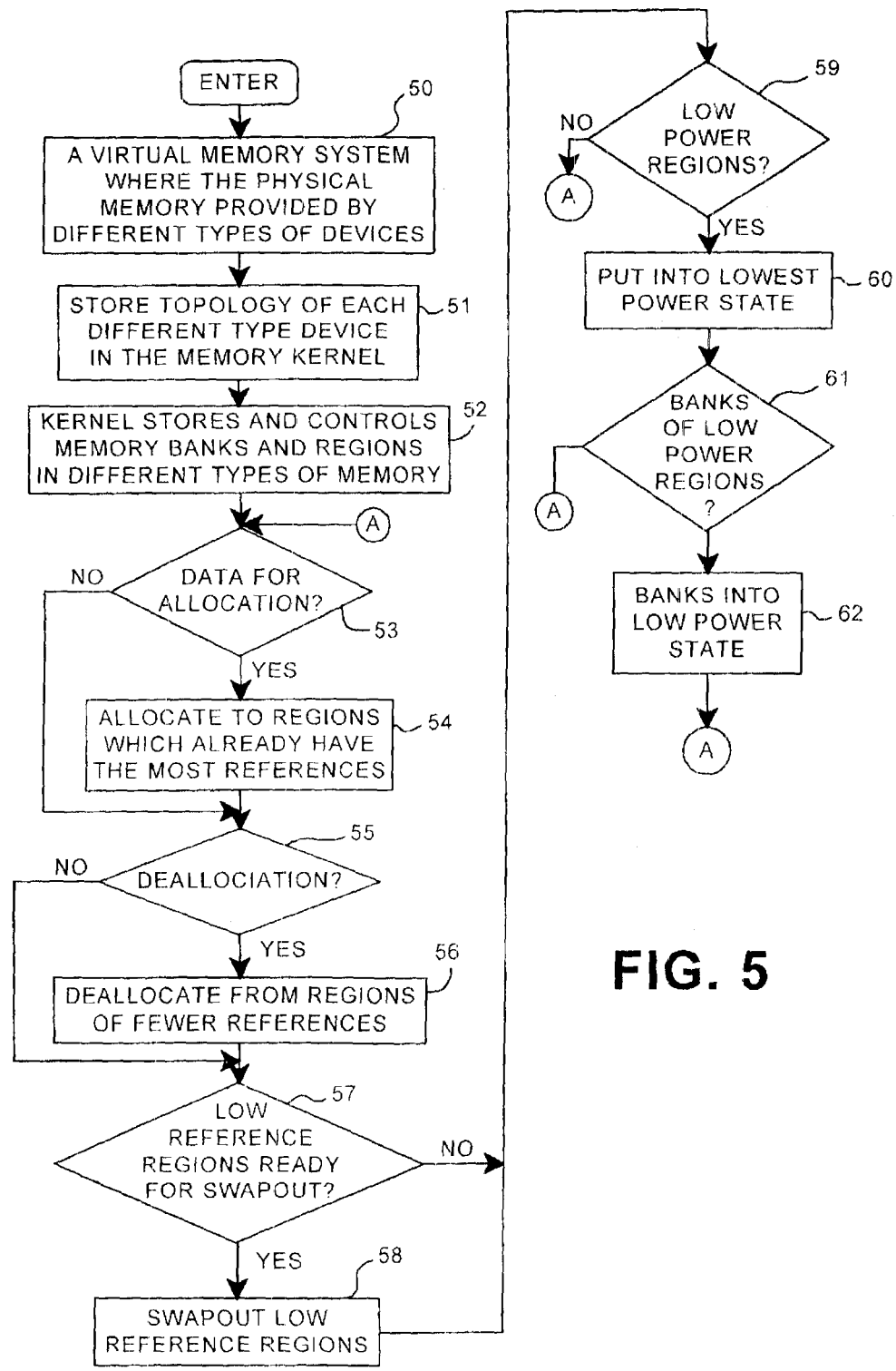
FIG. 5 is an illustrative flowchart of the running of a computer program according to the present invention using the topology of the different types of physical memory used to implement the present invention.

Referring now to FIG. 5, there is shown an illustrative flowchart of the running of a computer program according to the present invention using the topology of the different types of physical memory stored in association with the kernel. As previously described with respect to FIGS. 1 and 2, in a virtual memory system wherein the physical memory is provided by different types of devices 50, and the topology of each different type of device is stored in the kernel 51, the kernel coacts with the memory controller to control the memory banks and regions of the different types of memory 52. A determination is made, step 53, as to whether there is data for allocation to memory. If Yes, allocation is made to regions that already have the most references, step 54. Then, or if the decision in step 53 is No, a further determination is made as to whether there is any deallocation of data due to be made, step 55. If Yes, the deallocation is made from regions that already have the fewest of references, step 56. A determination is made as to whether there are any regions, the references to which are so low that such regions may be reduced to a lower power state if the data therein could be swapped-out, step 57. If Yes, appropriate swap-outs are made, step 58. Then, or if the decision in step 57 is No, a further determination is made as to whether there any regions of which usage is so low that the regions may be put into the lowest power consumption state, step 59. If Yes, such regions are put into the lowest power state, step 60. Then, a further determination is made as to whether there are banks of regions that could be put into the lowest power consumption state, step 61. If Yes, such banks are put into the lowest power consumption state. Then or if either of the decision steps 59 and 61 are No, the method is branched back to step 53 via branch "A".

In steps 52-56 of the embodiment, the allocation or deallocation is preserved as a decision step. The allocation/deallocation may be done in parallel with the sequential operation wherein the operation continues irrespective of allocation/deallocation.

As will be appreciated by one skilled in the art, aspects of the present invention may be embodied as a system, method or computer program product. Accordingly, aspects of the present invention may take the form of an entirely hardware embodiment, an entirely software embodiment, including firmware, resident software, micro-code, etc.; or an embodiment combining software and hardware aspects that may all generally be referred to herein as a "circuit", "module" or "system." Furthermore, aspects of the present invention may take the form of a computer program product embodied in one or more computer readable mediums having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared or semiconductor system, apparatus or device, or any suitable combination of the foregoing. More specific examples (a non-exhaustive list) of the computer readable storage medium would include the following: an electrical connection having one or more wires, a portable computer diskette, a hard disk, a Random Access Memory ("RAM"), a Read Only Memory ("ROM"), an Erasable Programmable Read Only Memory ("EPROM" or Flash memory), an optical fiber, a portable compact disc read only memory ("CD-ROM"), an optical storage device, a magnetic storage device or any suitable combination of the foregoing. In the context of this document, a computer readable storage medium may be any tangible medium that can contain or store a program for use by or in connection with an instruction execution system, apparatus or device.

A computer readable medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including, but not limited to, wireless, wire line, optical fiber cable, RF, etc., or any suitable combination the foregoing.

Computer program code for carrying out operations for aspects of the present invention may be written in any combination of one or more programming languages, including an object oriented programming language, such as Java, Smalltalk, C++ and the like, and conventional procedural programming languages, such as the "C" programming language or similar programming, languages. The program code may execute entirely on the user's computer, partly on the user's computer, as a stand-alone software package, partly on the user's computer and partly on a remote computer or entirely on the remote computer or server. In the later scenario, the remote computer may be connected to the user's computer through any type of network, including a local area network ("LAN") or a wide area network ("WAN"), or the connection may be made to an external computer (for example, through the Internet, using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer or other programmable data processing apparatus to produce a machine, such that instructions, which execute via the processor of the computer or other programmable data processing apparatus, create means for implementing the functions/acts specified flowchart and/or block diagram block or blocks.

These computer program instructions may also be stored in a computer readable medium that can direct a computer, other programmable data processing apparatus or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the Figures illustrate the architecture, functionality and operations of possible implementations of systems, methods and computer program products according to various embodiments of the present invention. In this regard, each block in the flowchart or block diagrams may represent a module segment, or portion of code, which comprises one or more executable instructions for implementing the specified logical function(s). It should be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustrations can be implemented by special purpose hardware-based systems that perform the specified functions or acts, or combinations of special purpose hardware and computer instructions.

Although certain preferred embodiments have been shown and described, it will be understood that many changes and modifications may be made therein without departing from the scope and intent of the appended claims.

What is claimed is:

1. A method for reducing virtual memory power consumption in a virtual memory system wherein physical memory is provided by a plurality of different physical memory devices comprising:

storing in the virtual memory kernel, topology data for each of said different memory devices including:
a memory bank data structure for each of said different devices including a plurality of independently powered memory regions, each memory region having at least one set of ranked power consuming zones ranked according to diminishing power consumption levels; and
dynamically reducing the power consumption levels in said regions, under kernel control, to the lowest operable ranked power consumption zone for each region.

2. The method of claim 1, wherein dynamically reducing includes reducing a region to a lower power consumption zone if the region is not referenced for a predetermined period of time.

3. The method of claim 2, further including allocating user data wherein fewer regions are referenced, and more regions are not referenced for said predetermined period of time and are reduced to the lowest power consumption zone.

4. The method of claim 3, wherein one memory region has a plurality of sets of power consumption zones of ranked diminishing power consumption levels.

5. The method of claim 4 wherein one of said plurality of sets of zones in said one memory region is phase-change memory (PCM) with higher power consumption, and said dynamically reducing includes minimizing referencing of said PCM.

6. The method of claim 3 wherein a plurality of memory regions are linked to a region of mirrored memory for enhanced reliability, and further including referencing regions with links to mirrored memory to maintain said enhanced reliability.

7. The method of claim 1, further including a plurality of memory banks, each bank including a plurality of said independently powered memory regions, wherein entire memory banks have all of their regions reduced to the lowest operable ranked power consumption zone for each region.

8. The method of claim 2, further including providing a zonelist, to be used in referencing regions, built as sequences of zones of the same power consumption level from each of said plurality of regions.

9. A virtual memory system for reducing virtual memory power consumption wherein physical memory provided by a plurality of different memory devices comprising:
a processor;
a computer memory holding computer program instructions which when executed by the processor perform the method comprising:
storing in the virtual memory kernel, topology data for each of said different memory devices including:
a memory bank data structure for each of said different devices including a plurality of independently powered memory regions, each memory region having at least one set of power consuming zones ranked according to diminishing power consumption levels; and
dynamically reducing the power consumption levels in said regions, under kernel control, to the lowest operable ranked power consumption zone for each region.

10. The virtual memory system of claim 9, wherein said dynamically reducing method step includes reducing a region to a lower power consumption zone if the region is not referenced for a predetermined period of time.

11. The virtual memory system of claim 10, wherein said performed method further includes allocating user data wherein fewer regions are referenced, and more regions are not referenced for said predetermined period of time, and are reduced to the lowest power consumption zone.

12. The virtual memory system of claim 10, wherein one memory region has a plurality of sets of power consumption zones of ranked diminishing power consumption levels.

13. The virtual memory system of claim 12 wherein one of said plurality of sets of zones in said one memory region is phase-change memory (PCM) with higher power consumption, and said performed method dynamically reducing step includes minimizing referencing of said PCM.

14. The virtual memory system of claim 11 wherein a plurality of memory regions are linked to a region of mirrored memory for enhanced reliability, and said performed method further includes referencing regions with links to mirrored memory to maintain said enhanced reliability.

15. The virtual memory system of claim 9, further including a plurality of memory banks, each bank including a plurality of said independently powered memory regions, wherein entire memory banks have all of their regions reduced to the lowest operable ranked power consumption zone for each region.

16. The virtual memory system of claim 10, wherein said performed method further includes providing a zonelist, to be used in referencing regions, built as sequences of zones of the same power consumption level from each of said plurality of regions.

17. A computer usable non-transitory storage medium having stored thereon a computer readable program for reducing virtual memory power consumption in a virtual memory system wherein physical memory is provided by a plurality of different physical memory devices, wherein the computer readable program when executed on a computer causes the computer to: store in the virtual memory kernel, topology data for each of said different memory devices including:
a memory bank data structure for each of said different devices including a plurality of independently powered memory regions, each memory region having at least one set of ranked power consuming zones ranked according to diminishing power consumption levels; and
dynamically reduce the power consumption levels in said regions, under kernel control, to the lowest operable ranked power consumption zone for each region.

18. The computer usable storage medium of claim 17, wherein said computer program when executed on a computer further causes the computer to dynamically reduce by reducing a region to a lower power consumption zone if the region is not referenced for a predetermined period of time.

19. The computer usable storage medium of claim 18, wherein the computer program when executed on a computer further causes the computer to allocate user data wherein fewer regions are referenced, and more regions are not referenced for said predetermined period of time, and are reduced to the lowest power consumption zone.

20. The computer usable storage medium of claim 19, wherein one memory region has a plurality of sets of power consumption zones of diminishing power consumption levels.

21. The computer usable storage medium of claim 20 wherein one of said plurality of sets of zones in said one memory region is phase-change memory (PCM) with higher power consumption, and
said computer program when executed on a compute causes the computer to dynamically reduce by minimizing referencing of said PCM.

22. The computer usable storage medium of claim 19 wherein:
- a plurality of memory regions are linked to region of mirrored memory for enhanced reliability, and
- said computer program when executed on a computer further references regions with links to mirrored memory to maintain said enhanced reliability.

23. The computer usable storage medium of claim 17, wherein said memory includes a plurality of memory banks, with each bank including a plurality of said independently powered memory regions, wherein entire memory banks have all of their regions reduced to the lowest operable ranked power consumption zone for each region.

24. The computer usable storage medium of claim 18, wherein the computer program when executed on a computer further causes the computer to further provide a zonelist, to be used in referencing regions, built as sequences of zones of the same power consumption level from each of said plurality of regions.

\* \* \* \* \*